United States Patent
Gasser

(10) Patent No.: US 6,666,306 B2
(45) Date of Patent: Dec. 23, 2003

(54) DAMPING DEVICE FOR MOVABLE FURNITURE PARTS

(75) Inventor: Ingo Gasser, Höchst (AT)

(73) Assignee: Julius Blum Gesellschaft m.b.H., Höchst (AT)

(*) Notice: Subject to any disclaimer, the term of this patent is extended or adjusted under 35 U.S.C. 154(b) by 0 days.

(21) Appl. No.: 10/041,568

(22) Filed: Jan. 10, 2002

(65) Prior Publication Data

US 2002/0096405 A1 Jul. 25, 2002

(30) Foreign Application Priority Data

Jan. 25, 2001  (AT) .............................. 117/2001

(51) Int. Cl.[7] .............................. F16D 63/00; E05F 1/00
(52) U.S. Cl. .......................... 188/82.1; 16/64
(58) Field of Search .............................. 188/82.1, 290, 188/293, 296; 16/64

(56) References Cited

U.S. PATENT DOCUMENTS

| 4,494,806 | A | * | 1/1985 | Williams et al. ............ 312/333 |
| 4,872,239 | A | | 10/1989 | Ferguson et al. |
| 5,839,548 | A | | 11/1998 | Parker et al. |
| 6,499,818 | B2 | * | 12/2002 | Brustle ..................... 312/319.1 |
| 2001/0008037 | A1 | * | 7/2001 | Brustle ......................... 16/71 |

FOREIGN PATENT DOCUMENTS

| DE | 3726031 | 2/1988 |
| DE | 19532863 | 3/1996 |
| EP | 0771971 | 5/1997 |
| WO | 01/50916 | 7/2001 |

* cited by examiner

*Primary Examiner*—Christopher P. Schwartz
(74) *Attorney, Agent, or Firm*—Wenderoth, Lind & Ponack, L.L.P.

(57) ABSTRACT

A damping device (14) for movable furniture parts comprising a fluid damper which is in the form of a rotational damper (20) and which includes two members which are rotatably movable relative to each other, namely a housing and a drum disposed in the housing. A damping fluid, for example a silicone oil, is disposed in the housing. During the damping action one of the two members is rotated by an actuating member and the other member is held fast. The rotational damper (20) is radially displaceably mounted and during the damping action is pressed by the actuating member against a retaining element (17).

23 Claims, 4 Drawing Sheets

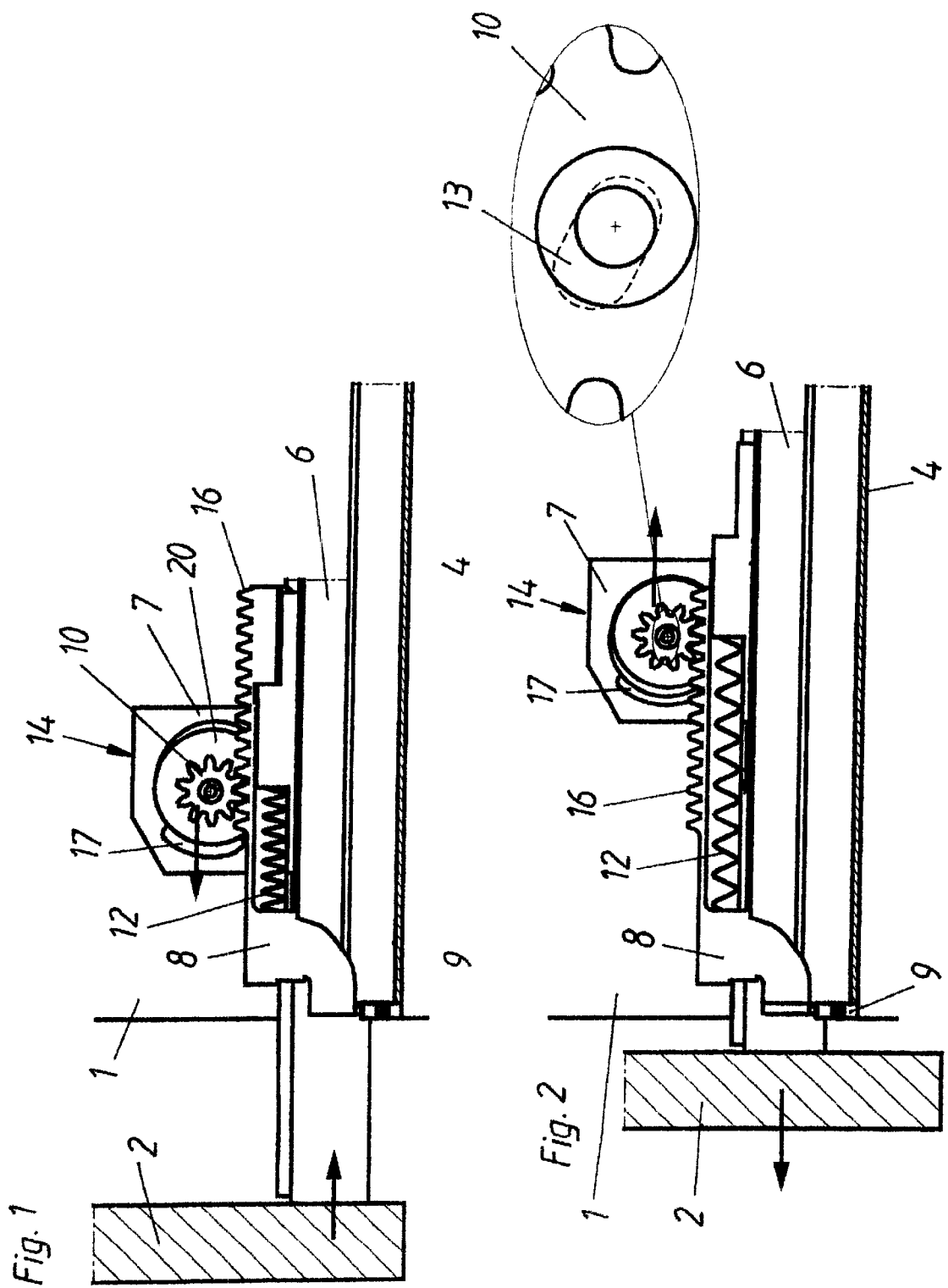

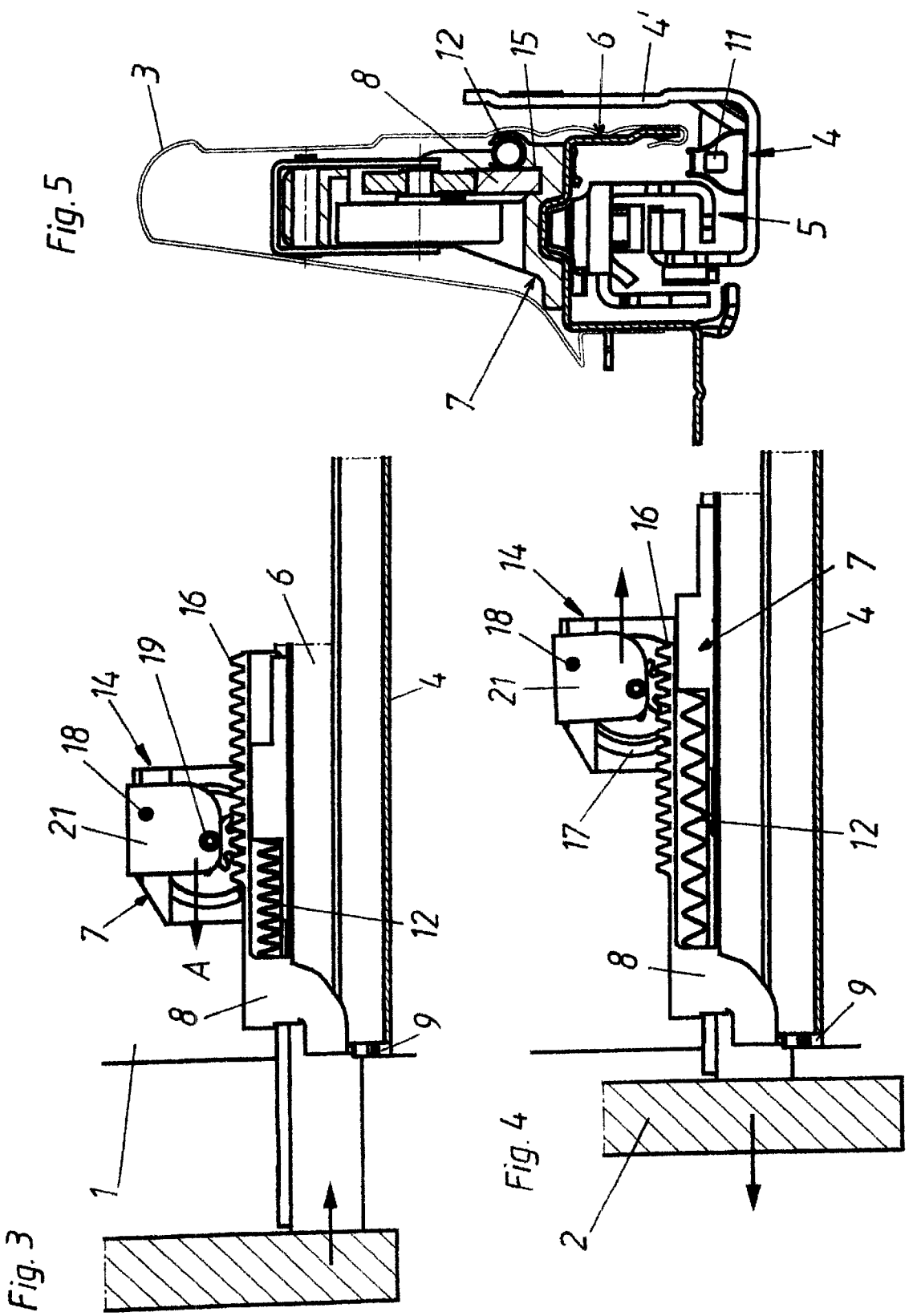

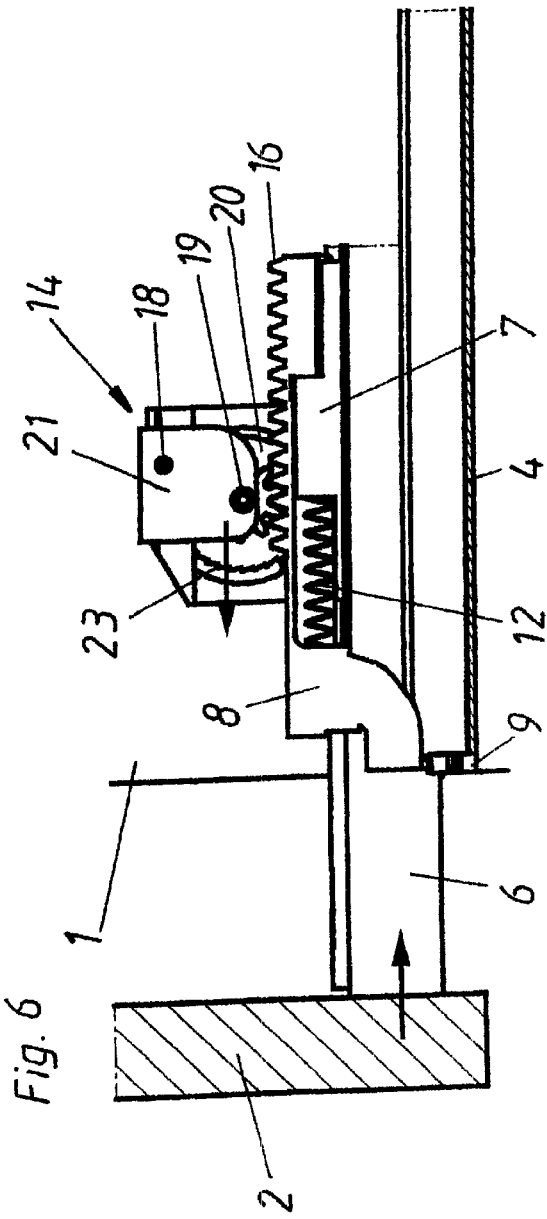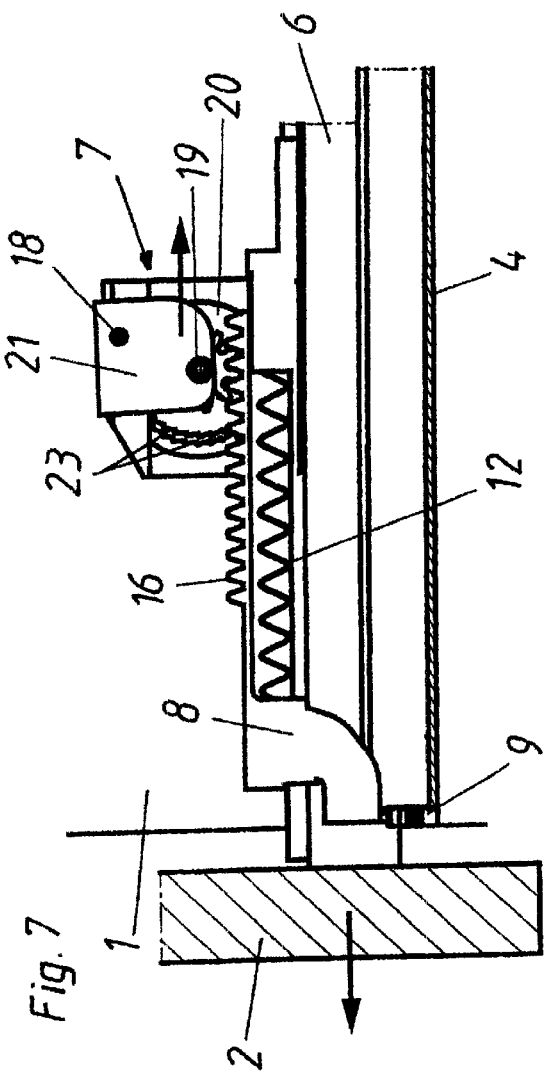

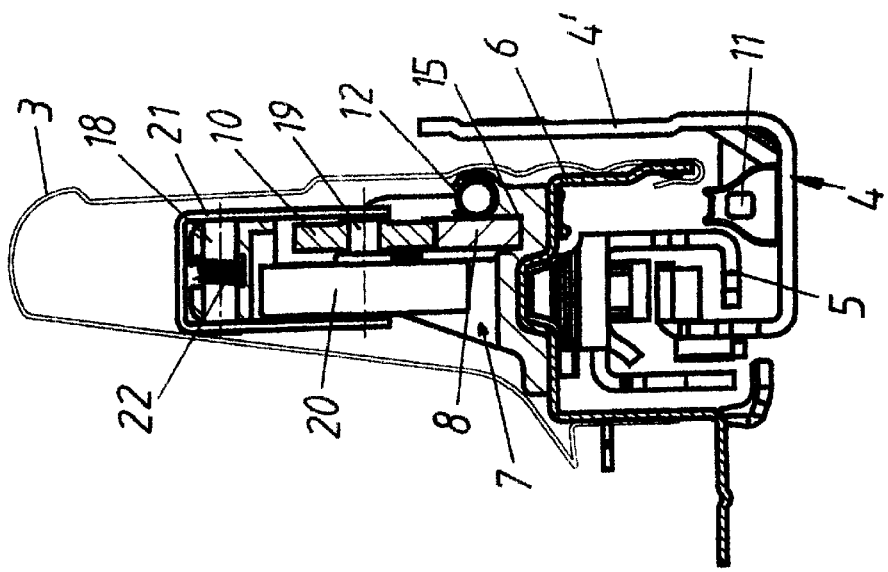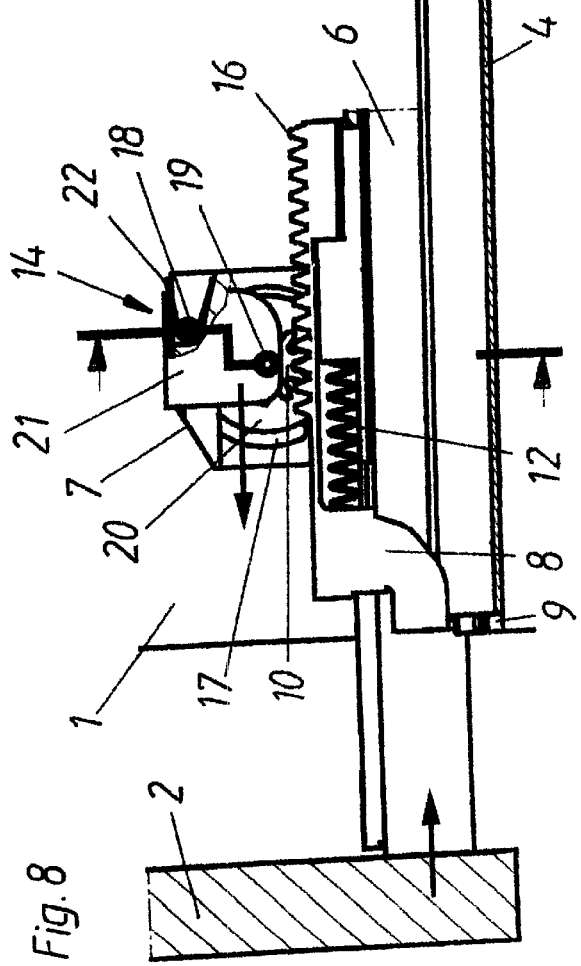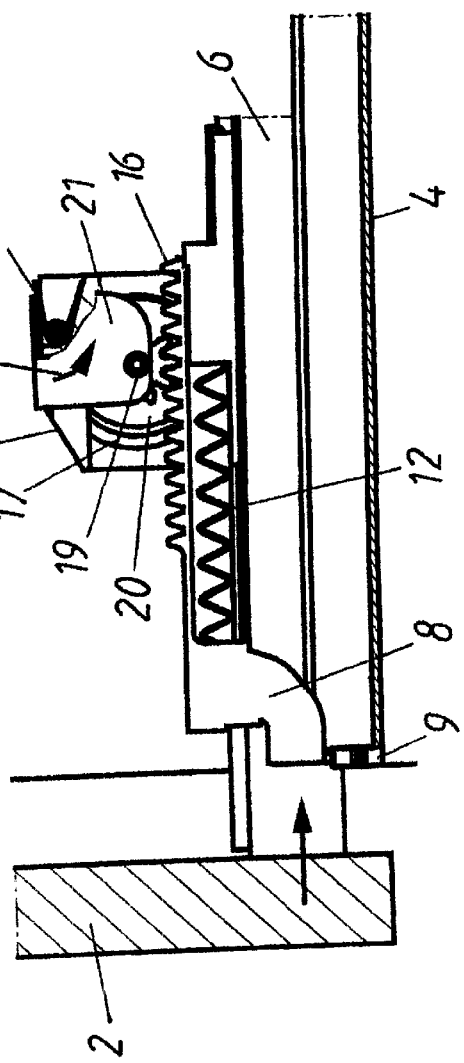

DAMPING DEVICE FOR MOVABLE FURNITURE PARTS

BACKGROUND OF THE INVENTION

The invention relates to a damping device for movable furniture parts comprising a fluid damper which is in the form of a rotational damper and which is radially displaceably supported and which includes two members which are rotatably movable relative to each other, namely a housing and a drum disposed in the housing, wherein disposed in the housing is a damping fluid, for example a silicone oil, and during damping one of the two members is rotated by an actuating member and the other member is held fast.

Damping devices of that kind are used in modern articles of furniture so that, when closing a door or a drawer, the door or a front panel of the drawer is prevented from hitting against the body of the article of furniture with excessive force.

Advantageously, damping devices of that kind are provided with a freewheel so that they move unimpededly into their readiness position when the door or the drawer is opened.

BRIEF SUMMARY OF THE INVENTION

The object of the invention is to provide a damping device of the kind set forth in the opening part of this specification with an improved and structurally simple freewheel arrangement.

The object in accordance with the invention is attained in that the rotational damper is pressed against a retaining element by the actuating member during the damping action.

It is advantageously provided that the drum is in the form of a rotor which, in the damping action, is rotated by the actuating member and that the housing is held by the retaining element.

The retained member can advantageously be held by frictional engagement or by a directional tooth locking means.

An advantageous embodiment of the invention provides that the rotational damper is mounted pivotably by means of a rocker member fixed to a carrier.

In a further embodiment of the invention it is provided that the rotational damper is mounted with a mounting axis in at least one and preferably two mutually opposite inclined elongate holes in a carrier.

In order to ensure, also in the case of a drawer or door which is closed very slowly, that the damping action of the damping device does not nullify the action of the device pulling the drawer or door shut so that the door or drawer would not be completely closed, a further preferred embodiment of the invention has a spring which lifts the rotational damper or the member of the rotational damper which is retained during the damping action off the retaining element.

Various embodiments of the invention are described hereinafter with reference to the Figures of the accompanying drawings.

BRIEF DESCRIPTION OF THE DRAWINGS

FIG. 1 shows a diagrammatic side view of a pull out guide assembly for a drawer, equipped with a damping device according to the invention during a closing movement, FIG. 2 shows the same side view as in FIG. 1 during an opening movement, FIG. 3 shows a side view of a pull out guide assembly, equipped with a damping device according to the invention in a further embodiment, during closure of the drawer, FIG. 4 shows the same side view as that of FIG. 3 during opening of the drawer, FIG. 5 is a view in section taken along line A—A in FIG. 3, FIG. 6 shows a side view of a pull out guide assembly, equipped with a further embodiment of the damping device according to the invention, during closure of the drawer, FIG. 7 shows the same view as that in FIG. 6 during opening of the drawer, FIG. 8 shows a side view of a pull out guide assembly for a drawer, equipped with a further embodiment of the damping device according to the invention, during closure of the drawer, FIG. 9 shows the same side view as in FIG. 8 during opening of the drawer, and FIG. 10 is a view in section taken along line A—A in FIG. 8.

DETAILED DESCRIPTION OF THE INVENTION

Drawers are guided slidably in a body 1 of an article of furniture with side walls 1; by means of pull out guide assemblies. The drawers have, at each of two sides respective drawer side walls 3 which cover rails 4, 5, 6 of the pull out guide assembly as far as a fixing limb 4' of the support rails 4. The drawer side walls 3 likewise covers a damping device 14 according to the invention.

Fixed on pull out rail 6 is a carrier 7 of the damping device 14, which carries a rotational damper 20. A pinion 10 is mounted on the spindle of the rotational damper 20.

The carrier 7 is provided with a groove 15 in which a slider 8 is horizontally slidably mounted. The slider 8 has a rack profile 16 meshing with the pinion 10. A tension spring 12 is fixed on the one hand to the slider 8 and on the other hand to the carrier 7.

The slider 8 further has a slider abutment 9 which projects through a slot in the pull out rail 6. An abutment 11 is provided, for the slider 8, on the support rail 4 at the body side.

When a drawer 2 is opened, the tension spring 12 pulls the slider 8 into the damping position. When now the drawer 2 is closed the slider abutment 9 strikes against the abutment 11 at the body side, whereupon no further relative movement occurs between the slider 8 and the body rail 4. The pull out rail 6 however is moved further rearwardly together with the housing 7 and thereby the pinion 10 which rolls against the rack profile 16 is rotated and the rotational damper 20 supported on the carrier 7 comes into action.

When the drawer 2 is opened the slider 8 is moved by the tension spring 12 into the initial position again, that is to say into the damping position.

Disposed in the carrier 7, at the side which is towards the front panel member 2 of the drawer, is a retaining element or holding jaw 17 which, for example, is formed from a rubber or a plastic material involving a high degree of friction.

In the embodiment shown in FIGS. 1 and 2 the rotational damper 20 is mounted slidably with the pinion 10 in longitudinal slots 13 in the carrier 7.

The longitudinal slots 13 are oriented to incline upwardly in a direction towards the front panel member 2 of the drawer and lie in the resultant of the forces which act in the damping operation on the rotational damper 20. The rotational damper 20 is therefore pressed with a sufficient force against the retaining element 17.

When the drawer 2 is closed, after the abutment 9 of the slider 8 has hit against the abutment 11 at the body side, then as stated above relative movement occurs between the carrier 7 and the slider 8. By virtue of that relative movement, the rotational damper 20 is urged against the retaining element 17 and thereby a housing of the rotational damper 20 is held non-rotatably in the housing 7 by the retaining element 17. In other words, the pinion 10 rotates a rotational drummer piston disposed in the housing of the rotational damper 20 and the damping device 14 is in action.

When, in contrast, the drawer 2 is opened, the rotational damper 20 slides in the longitudinal slots 13, as shown in FIG. 2, downwardly and thus rearwardly relative to the carrier 7. The housing of the rotational damper 20 is thus disposed at a spacing from the retaining element 17, and the entire rotational damper 20 is rotated together with its housing when the relative movement occurs between the slider 8 and the pinion 10. No damping or braking action thus takes place.

In the embodiments shown in FIGS. 3 to 10 the rotational damper 20 is mounted on the carrier 7 by means of a rocker member 21. The rocker member 21 is tiltable about an axis 18. The axis 18, by means of which the rocker member 21 is supported on the carrier 7, is set back, with respect to the depth of the article of furniture, in relation to a spindle 19 by means of which the rotational damper 20 is mounted with the pinion 10 on the rocker member 21.

When unloaded, therefore, the rocker member 21 with the rotational damper 20 will assume the position shown in FIG. 4, that is to say the housing of the rotational damper 20 is disposed at a spacing from the retaining element 17. However, as soon as the abutment 9 of the slider 8 hits against the abutment 11 at the body side upon closure of the drawer 2, a relative movement again occurs between the slider 8 and the carrier 7 and the rocker member 21 is urged with the rotational damper 20 in the direction of the arrow A in FIG. 3 against the retaining element 17, whereby the housing of the rotational damper 20 is held non-rotatably and the damping action of the rotational damper 20 comes into effect. The rotational damper 20 is moved upon movement of the rocker member 21 in approximately parallel relationship with the direction of movement of the slider 8.

In the embodiment shown in FIGS. 3 to 5 the retaining element 17 is a rubber or plastic member which holds the housing of the rotational damper 20 by frictional engagement.

In the embodiment shown in FIGS. 6 and 7 the retaining element 17 and the housing of the rotational damper 20 are provided with a directional tooth locking means 23. The function of the damping device 14 is the same as in the above-described embodiment. The housing of the rotational damper 20 is held fast by the retaining element 17; by means of the directional tooth locking means 23; instead of by frictional engagement.

In the embodiment shown in FIGS. 8 to 10, a spring 22, which is in the form of a leg spring, is mounted on the carrier 7 and urges the rocker member 21 in the direction of the arrow B in FIG. 9. In other words, if no, or only a slight, pressure is applied to the pinion 10 by the slider 8, the rocker member 21 is urged in the direction of the arrow B by the spring 22 and the housing of the rotational damper 20 is certain to be moved away from the retaining element 17 so that the drawer can move into the closed position unimpeded by the damping device 14.

What is common to all embodiments is that the pinion 10 of the rotational damper 20 and the rack profile of the actuating member are constantly in engagement with each other.

The pull out guide assembly according to the invention is preferably provided with a drawer retraction device as is described for example in EP 0 391 221 B1. In that case the spring of the drawer retraction device must be stronger than the tension spring 12 so that the drawer 2 is certain to be closed.

What is claimed is:

1. A damping device for movable furniture parts, comprising:
   a rotational fluid damper which is radially displaceably supported, said rotational fluid damper including a housing and a drum disposed in said housing, said housing and said drum being rotatably movable relative to each other;
   a damping fluid disposed in said housing;
   wherein during damping one of said drum and said housing is rotated by an actuating member and the other of said drum and said housing is held fast; and
   wherein said rotational fluid damper is pressed against a retaining element during damping.

2. The damping device of claim 1, wherein said rotational fluid damper is mounted on a pull out rail of a pull out guide assembly for a drawer, and has a pinion meshing with a rack of said actuating member, said actuating member comprising a slider displaceable relative to said pull out rail, said drawer side wall and a support rail located at a body side of a piece of furniture, wherein an abutment for said actuating member is disposed at said body side.

3. The damping device of claim 2, wherein said pull out rail and said rotational fluid damper are arranged within said drawer side wall.

4. The damping device of claim 2, wherein said rotational fluid damper is mounted in a housing fixed to said pull out rail or a drawer cover member.

5. The damping device of claim 2, wherein said slider is biased by a spring.

6. The damping device of claim 5, wherein said slider is slidably mounted in a housing fixed to said pull out rail or a drawer cover member and wherein said spring is a tension spring anchored to said slider and said housing.

7. The damping device of claim 2, wherein said slider is slidably mounted in a housing fixed to said pull out rail or a drawer cover member.

8. The damping device of claim 2, wherein said pinion of said rotational fluid damper and said rack of said actuating member are constantly in engagement with each other.

9. The damping device of claim 1, wherein said retaining element is a holding jaw which bears against a surface of said other of said drum and said housing.

10. The damping device of claim 9, wherein said other of said drum and said housing is said housing.

11. The damping device of claim 10, wherein said housing of said rotational fluid damper is provided with directional tooth locking elements.

12. The damping device of claim 9, wherein said holding jaw embraces approximately a quarter of the periphery of said other of said drum and said housing.

13. The damping device of claim 1, wherein said rotational fluid damper is pivotably mounted by a rocker member fixed to a carrier.

14. The damping device of claim 13, wherein said rotational fluid damper has a mounting spindle mounting said rotational fluid damper to said rocker member that is positioned on an axis of rotation of said rotational fluid damper.

15. The damping device of claim 13, wherein said rotational damper is movable in an at least approximately parallel relationship with a direction of movement of said actuating member.

16. The damping device of claim 1, wherein said other of said drum and said housing is held by said retaining element by frictional engagement during said damping.

17. The damping device of claim 1, wherein said other of said drum and said housing is provided with directional tooth locking elements.

18. The damping device of claim 1, wherein said drum is a rotor rotated during the damping by said actuating member and said housing is held by said retaining element.

19. The damping device of claim 1, wherein said rotational fluid damper has a mounting spindle mounting said rotational fluid damper in at least one inclined elongate hole provided in a carrier.

20. The damping device of claim 1, wherein a spring is provided to lift said rotational fluid damper off of said retaining element.

21. The damping device of claim 1, wherein said rotational fluid damper is mounted to a drawer side wall.

22. The damping device of claim 1, wherein an abutment is provided at a support rail for said actuating member.

23. The damping device of claim 1, wherein said damping fluid is a silicone oil.

* * * * *